(12) United States Patent
Jaramillo et al.

(10) Patent No.: US 8,781,840 B2
(45) Date of Patent: *Jul. 15, 2014

(54) RETRIEVAL AND PRESENTATION OF NETWORK SERVICE RESULTS FOR MOBILE DEVICE USING A MULTIMODAL BROWSER

(71) Applicant: David Jaramillo, Lake Worth, FL (US)

(72) Inventors: David Jaramillo, Lake Worth, FL (US); Marc White, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/756,073

(22) Filed: Jan. 31, 2013

(65) Prior Publication Data

US 2013/0158994 A1 Jun. 20, 2013

Related U.S. Application Data

(60) Continuation of application No. 13/283,448, filed on Oct. 27, 2011, now Pat. No. 8,380,516, which is a division of application No. 11/422,093, filed on Jun. 5, 2006, now Pat. No. 8,073,700.

(60) Provisional application No. 60/716,249, filed on Sep. 12, 2005.

(51) Int. Cl.
*H04M 3/493* (2006.01)

(52) U.S. Cl.
CPC .................................... *H04M 3/493* (2013.01)
USPC ..................................................... 704/270.1

(58) Field of Classification Search
CPC ....................................................... H04M 3/493
USPC ........................................................ 704/270.1
See application file for complete search history.

(56) References Cited

U.S. PATENT DOCUMENTS

| 5,097,528 A | 3/1992 | Gursahaney et al. |
| 5,577,165 A | 11/1996 | Takebayashi et al. |

(Continued)

FOREIGN PATENT DOCUMENTS

| CN | 1385783 A | 12/2002 |
| CN | 1564123 A | 1/2005 |

(Continued)

OTHER PUBLICATIONS

International Search Report mailed Nov. 17, 2006 for Application No. PCT/EP2006/066037.

(Continued)

*Primary Examiner* — Susan McFadden
(74) *Attorney, Agent, or Firm* — Wolf, Greenfield & Sacks, P.C.

(57) ABSTRACT

A method of obtaining information using a mobile device can include receiving a request including speech data from the mobile device, and querying a network service using query information extracted from the speech data, whereby search results are received from the network service. The search results can be formatted for presentation on a display of the mobile device. The search results further can be sent, along with a voice grammar generated from the search results, to the mobile device. The mobile device then can render the search results.

20 Claims, 3 Drawing Sheets

(56) References Cited

U.S. PATENT DOCUMENTS

| | | | |
|---|---|---|---|
| 5,584,052 | A | 12/1996 | Gulau et al. |
| 5,646,979 | A | 7/1997 | Knuth |
| 5,689,547 | A | 11/1997 | Molne |
| 5,884,262 | A | 3/1999 | Wise et al. |
| 5,953,392 | A | 9/1999 | Rhie et al. |
| 5,969,717 | A | 10/1999 | Ikemoto |
| 5,991,615 | A | 11/1999 | Coppinger et al. |
| 6,028,601 | A | 2/2000 | Machiraju et al. |
| 6,031,467 | A | 2/2000 | Hymel et al. |
| 6,084,583 | A | 7/2000 | Gerszberg et al. |
| 6,101,472 | A | 8/2000 | Giangarra et al. |
| 6,128,651 | A | 10/2000 | Cezar |
| 6,141,010 | A | 10/2000 | Hoyle |
| 6,157,841 | A | 12/2000 | Bolduc et al. |
| 6,208,972 | B1 | 3/2001 | Grant et al. |
| 6,212,545 | B1 | 4/2001 | Ohtani et al. |
| 6,243,375 | B1 | 6/2001 | Speicher |
| 6,243,443 | B1 | 6/2001 | Low et al. |
| 6,275,806 | B1 | 8/2001 | Pertrushin |
| 6,285,862 | B1 | 9/2001 | Ruhl et al. |
| 6,298,218 | B1 | 10/2001 | Lowe et al. |
| 6,301,560 | B1 | 10/2001 | Masters |
| 6,321,209 | B1 | 11/2001 | Pasquali |
| 6,332,127 | B1 | 12/2001 | Bandera et al. |
| 6,381,465 | B1 | 4/2002 | Chern et al. |
| 6,393,296 | B1 | 5/2002 | Sabnani et al. |
| 6,397,057 | B1 | 5/2002 | Malackowski et al. |
| 6,400,806 | B1 | 6/2002 | Uppaluru |
| 6,401,085 | B1 | 6/2002 | Gershman et al. |
| 6,405,123 | B1 | 6/2002 | Rennard et al. |
| 6,452,498 | B2 | 9/2002 | Stewart |
| 6,484,148 | B1 | 11/2002 | Boyd |
| 6,513,011 | B1 | 1/2003 | Uwakubo |
| 6,529,159 | B1 | 3/2003 | Fan et al. |
| 6,552,682 | B1 | 4/2003 | Fan |
| 6,560,456 | B1 | 5/2003 | Lohtia et al. |
| 6,594,347 | B1 | 7/2003 | Calder et al. |
| 6,600,736 | B1 | 7/2003 | Ball et al. |
| 6,601,026 | B2 | 7/2003 | Appelt et al. |
| 6,606,599 | B2 | 8/2003 | Grant et al. |
| 6,606,611 | B1 | 8/2003 | Khan et al. |
| 6,608,556 | B2 | 8/2003 | DeMoerloose et al. |
| 6,636,733 | B1 | 10/2003 | Helferich |
| 6,647,269 | B2 | 11/2003 | Hendrey et al. |
| 6,658,389 | B1 | 12/2003 | Alpdemir |
| 6,664,922 | B1 | 12/2003 | Fan |
| 6,701,162 | B1 | 3/2004 | Everett |
| 6,769,010 | B1 | 7/2004 | Knapp et al. |
| 6,772,213 | B2 | 8/2004 | Glorikian |
| 6,789,077 | B1 | 9/2004 | Slaughter et al. |
| 6,813,501 | B2 | 11/2004 | Kinnunen et al. |
| 6,823,257 | B2 | 11/2004 | Clapper |
| 6,826,614 | B1 | 11/2004 | Hanmann et al. |
| 6,842,767 | B1 | 1/2005 | Partovi et al. |
| 6,856,960 | B1 | 2/2005 | Dragosh et al. |
| 6,862,445 | B1 | 3/2005 | Cohen |
| 6,885,736 | B2 | 4/2005 | Uppaluru |
| 6,895,084 | B1 | 5/2005 | Saylor et al. |
| 6,912,400 | B1 | 6/2005 | Olsson et al. |
| 6,920,425 | B1 | 7/2005 | Will et al. |
| 6,941,273 | B1 | 9/2005 | Loghmani et al. |
| 6,965,864 | B1 | 11/2005 | Thrift et al. |
| 6,973,429 | B2 * | 12/2005 | Smith ............................ 704/257 |
| 6,978,136 | B2 | 12/2005 | Jenniges et al. |
| 6,980,834 | B2 | 12/2005 | Gupta et al. |
| 6,999,930 | B1 | 2/2006 | Roberts et al. |
| 7,007,074 | B2 | 2/2006 | Radwin |
| 7,016,845 | B2 | 3/2006 | Vora et al. |
| 7,020,609 | B2 | 3/2006 | Thrift et al. |
| 7,028,306 | B2 | 4/2006 | Boloker et al. |
| 7,035,805 | B1 | 4/2006 | Miller |
| 7,103,349 | B2 | 9/2006 | Himanen et al. |
| 7,113,911 | B2 | 9/2006 | Hinde et al. |
| 7,116,976 | B2 | 10/2006 | Thomas et al. |
| 7,116,985 | B2 | 10/2006 | Wilson et al. |
| 7,136,634 | B1 | 11/2006 | Rissanen et al. |
| 7,136,846 | B2 | 11/2006 | Chang et al. |
| 7,137,126 | B1 | 11/2006 | Coffman et al. |
| 7,162,365 | B2 | 1/2007 | Clapper |
| 7,171,243 | B2 | 1/2007 | Wantanabe et al. |
| 7,188,067 | B2 | 3/2007 | Grant et al. |
| 7,203,721 | B1 | 4/2007 | Ben-Efraim et al. |
| 7,210,098 | B2 | 4/2007 | Sibal et al. |
| 7,212,971 | B2 | 5/2007 | Jost et al |
| 7,231,025 | B2 | 6/2007 | Labaton |
| 7,257,575 | B1 | 8/2007 | Johnston et al. |
| 7,283,850 | B2 | 10/2007 | Granovetter et al. |
| 7,328,770 | B2 | 2/2008 | Owens et al. |
| 7,330,890 | B1 | 2/2008 | Partovi et al. |
| 7,346,374 | B2 | 3/2008 | Witkowski et al. |
| 7,359,723 | B2 | 4/2008 | Jones |
| 7,376,434 | B2 | 5/2008 | Thomas et al. |
| 7,376,586 | B1 | 5/2008 | Partovi et al. |
| 7,379,969 | B2 | 5/2008 | Osborn, Jr. |
| 7,415,537 | B1 | 8/2008 | Maes |
| 7,437,183 | B2 | 10/2008 | Makinen |
| 7,457,397 | B1 | 11/2008 | Saylor et al. |
| 7,477,909 | B2 | 1/2009 | Roth |
| 7,487,085 | B2 | 2/2009 | Ativanichayaphong et al. |
| 7,487,453 | B2 | 2/2009 | Goebel et al. |
| 7,489,946 | B2 | 2/2009 | Srinivasan et al. |
| 7,493,259 | B2 | 2/2009 | Jones et al. |
| 7,493,260 | B2 | 2/2009 | Harb et al. |
| 7,502,627 | B2 | 3/2009 | Sacks et al. |
| 7,505,978 | B2 | 3/2009 | Bodin et al. |
| 7,509,260 | B2 | 3/2009 | Cross et al. |
| 7,509,659 | B2 | 3/2009 | McArdle |
| 7,515,900 | B2 | 4/2009 | Van Camp |
| 7,545,917 | B2 | 6/2009 | Jones et al. |
| 7,551,916 | B2 | 6/2009 | Gortz et al. |
| 7,564,959 | B2 | 7/2009 | Greenaae et al. |
| 7,603,291 | B2 | 10/2009 | Raiyani et al. |
| 7,636,426 | B2 | 12/2009 | Korah et al. |
| 7,650,170 | B2 | 1/2010 | May et al. |
| 7,664,649 | B2 | 2/2010 | Jost et al. |
| 7,689,253 | B2 | 3/2010 | Basir |
| 7,706,780 | B2 | 4/2010 | Adler |
| 7,706,818 | B2 | 4/2010 | Cho |
| 7,787,867 | B2 | 8/2010 | Berger et al. |
| 7,801,728 | B2 | 9/2010 | Ben-David et al. |
| 7,808,980 | B2 | 10/2010 | Skakkebaek et al. |
| 7,809,575 | B2 | 10/2010 | Ativanichayaphong et al. |
| 7,822,608 | B2 | 10/2010 | Cross et al. |
| 7,827,033 | B2 | 11/2010 | Ativanichayaphong et al. |
| 7,864,929 | B2 | 1/2011 | Carro |
| 7,890,128 | B1 | 2/2011 | Thomas et al. |
| 7,899,173 | B2 | 3/2011 | Ahn et al. |
| 7,937,125 | B2 | 5/2011 | May et al. |
| 7,965,196 | B2 | 6/2011 | Liebermann |
| RE42,738 | E | 9/2011 | Williams |
| 8,041,296 | B2 | 10/2011 | Skog et al. |
| 8,046,220 | B2 * | 10/2011 | Agarwal et al. ............... 704/235 |
| 8,065,143 | B2 | 11/2011 | Yanagihara |
| 8,073,590 | B1 | 12/2011 | Zilka |
| 8,073,700 | B2 * | 12/2011 | Jaramillo et al. .......... 704/270.1 |
| 8,082,148 | B2 | 12/2011 | Agapi et al. |
| 8,086,289 | B2 | 12/2011 | May et al. |
| 8,103,509 | B2 | 1/2012 | Burns et al. |
| 8,112,104 | B1 | 2/2012 | Thomas et al. |
| 8,121,837 | B2 | 2/2012 | Agapi et al. |
| 8,200,295 | B2 | 6/2012 | May et al. |
| 8,203,528 | B2 | 6/2012 | Spalink |
| 8,214,242 | B2 | 7/2012 | Agapi et al. |
| 8,229,081 | B2 | 7/2012 | Agapi et al. |
| 8,233,919 | B2 | 7/2012 | Haag et al. |
| 8,243,888 | B2 | 8/2012 | Cho |
| 8,260,247 | B2 | 9/2012 | Lazaridis et al. |
| 8,265,659 | B2 | 9/2012 | Lee |
| 8,265,862 | B1 | 9/2012 | Zilka |
| 8,270,980 | B2 | 9/2012 | Forssell |
| 8,280,419 | B1 | 10/2012 | Thomas et al. |
| 8,280,434 | B2 | 10/2012 | Garg |
| 8,285,213 | B2 | 10/2012 | Skog et al. |
| 8,285,273 | B2 | 10/2012 | Roth |

(56) References Cited

U.S. PATENT DOCUMENTS

| | | |
|---|---|---|
| 8,290,540 B2 | 10/2012 | Kittel et al. |
| 8,301,168 B2 | 10/2012 | Zubas et al. |
| 8,315,875 B2 | 11/2012 | Burns et al. |
| 8,326,328 B2 | 12/2012 | LeBeau et al. |
| 8,340,966 B2 | 12/2012 | Kerimovska et al. |
| 8,344,851 B2 | 1/2013 | Bisht |
| 8,359,020 B2 | 1/2013 | Lebeau et al. |
| 8,374,872 B2 * | 2/2013 | Kesireddy ............ 704/257 |
| 8,380,516 B2 * | 2/2013 | Jaramillo et al. ....... 704/270.1 |
| RE44,103 E | 3/2013 | Williams |
| 8,412,284 B2 | 4/2013 | Khoshaba et al. |
| 8,442,429 B2 | 5/2013 | Hawit |
| 8,442,447 B2 | 5/2013 | Veluppillai et al. |
| 8,447,285 B1 | 5/2013 | Bladon et al. |
| 8,447,598 B2 | 5/2013 | Chutorash et al. |
| 8,457,612 B1 | 6/2013 | Daniell |
| 8,457,963 B2 | 6/2013 | Charriere |
| 8,489,690 B2 | 7/2013 | Abuelsaad et al. |
| 8,508,379 B2 | 8/2013 | Vander Veen et al. |
| 8,526,932 B2 | 9/2013 | Tofighbakhsh et al. |
| 8,538,386 B2 | 9/2013 | May et al. |
| 8,538,491 B2 | 9/2013 | Khoshaba et al. |
| 8,549,501 B2 | 10/2013 | Eichenberger et al. |
| 8,554,254 B2 | 10/2013 | May et al. |
| 8,559,922 B2 | 10/2013 | Hardin |
| 8,565,820 B2 | 10/2013 | Riemer et al. |
| 8,571,612 B2 | 10/2013 | Gold |
| 8,577,422 B1 | 11/2013 | Ledet |
| 8,577,543 B2 | 11/2013 | Basir et al. |
| 8,583,093 B1 | 11/2013 | Bort |
| 8,583,431 B2 | 11/2013 | Furman et al. |
| 8,594,743 B2 | 11/2013 | Sano |
| 2001/0051517 A1 | 12/2001 | Strietzel |
| 2001/0053252 A1 | 12/2001 | Creque |
| 2002/0062393 A1 | 5/2002 | Borger et al. |
| 2002/0065828 A1 | 5/2002 | Goodspeed |
| 2002/0065944 A1 | 5/2002 | Hickey et al. |
| 2002/0077086 A1 | 6/2002 | Tuomela et al. |
| 2002/0087408 A1 | 7/2002 | Burnett |
| 2002/0092019 A1 | 7/2002 | Marcus |
| 2002/0095472 A1 | 7/2002 | Berkowitz et al. |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2002/0194388 A1 | 12/2002 | Boloker et al. |
| 2003/0024975 A1 | 2/2003 | Rajasekharan |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0078779 A1 | 4/2003 | Desai et al. |
| 2003/0101451 A1 | 5/2003 | Bentolila et al. |
| 2003/0125945 A1 | 7/2003 | Doyle |
| 2003/0125958 A1 | 7/2003 | Alpdemir et al. |
| 2003/0171926 A1 | 9/2003 | Suresh et al. |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0006478 A1 | 1/2004 | Alpdemir et al. |
| 2004/0019487 A1 | 1/2004 | Kleindienst et al. |
| 2004/0025115 A1 | 2/2004 | Seinel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0076279 A1 | 4/2004 | Taschereau |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Ferrans et al. |
| 2004/0140989 A1 | 7/2004 | Papageorge |
| 2004/0153323 A1 | 8/2004 | Charney et al. |
| 2004/0179038 A1 | 9/2004 | Blattner et al. |
| 2004/0203766 A1 | 10/2004 | Jenniges et al. |
| 2004/0216036 A1 | 10/2004 | Chu et al. |
| 2004/0224662 A1 | 11/2004 | O'Neil et al. |
| 2004/0236574 A1 | 11/2004 | Ativanichayaphong et al. |
| 2004/0260562 A1 | 12/2004 | Kujirai |
| 2005/0004840 A1 | 1/2005 | Wanninger |
| 2005/0015256 A1 | 1/2005 | Kargman |
| 2005/0021744 A1 | 1/2005 | Haitsuka et al. |
| 2005/0033582 A1 | 2/2005 | Gadd et al. |
| 2005/0054381 A1 | 3/2005 | Lee et al. |
| 2005/0075884 A1 | 4/2005 | Badt, Jr. |
| 2005/0091059 A1 | 4/2005 | Lecoeuche |
| 2005/0131701 A1 | 6/2005 | Cross et al. |
| 2005/0138219 A1 | 6/2005 | Bou-Ghannam et al. |
| 2005/0138562 A1 | 6/2005 | Carro |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger et al. |
| 2005/0283367 A1 | 12/2005 | Cross |
| 2006/0004627 A1 | 1/2006 | Baluja |
| 2006/0047510 A1 | 3/2006 | Ativanichayaphong et al. |
| 2006/0064302 A1 | 3/2006 | Cross |
| 2006/0069564 A1 | 3/2006 | Allison et al. |
| 2006/0074680 A1 | 4/2006 | Cross et al. |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0150119 A1 | 7/2006 | Chesnais et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0264209 A1 | 11/2006 | Atkinson et al. |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0032229 A1 | 2/2007 | Jones |
| 2007/0061146 A1 | 3/2007 | Jaramillo et al. |
| 2007/0099636 A1 | 5/2007 | Roth |
| 2007/0169143 A1 | 7/2007 | Li |
| 2007/0174244 A1 | 7/2007 | Jones |
| 2007/0174273 A1 | 7/2007 | Jones et al. |
| 2007/0174904 A1 | 7/2007 | Park |
| 2007/0185768 A1 | 8/2007 | Vengroff et al. |
| 2007/0185841 A1 | 8/2007 | Jones et al. |
| 2007/0185843 A1 | 8/2007 | Jones et al. |
| 2007/0265851 A1 | 11/2007 | Cross et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross et al. |
| 2008/0027707 A1 | 1/2008 | Stefik et al. |
| 2008/0065386 A1 | 3/2008 | Cross et al. |
| 2008/0065387 A1 | 3/2008 | Cross, Jr. et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0097760 A1 | 4/2008 | Hong et al. |
| 2008/0140410 A1 | 6/2008 | Cross et al. |
| 2008/0162136 A1 | 7/2008 | Ativanichayaphong et al. |
| 2008/0177530 A1 | 7/2008 | Cross et al. |
| 2008/0195393 A1 | 8/2008 | Cross et al. |
| 2008/0208584 A1 | 8/2008 | Cross et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Cross et al. |

(56) References Cited

U.S. PATENT DOCUMENTS

| | | |
|---|---|---|
| 2008/0208588 A1 | 8/2008 | Cross et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |
| 2008/0235022 A1 | 9/2008 | Cross et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Cross et al. |
| 2009/0030680 A1 | 1/2009 | Mamou |
| 2009/0271199 A1 | 10/2009 | Agapi et al. |
| 2013/0005367 A1 | 1/2013 | Roth et al. |

FOREIGN PATENT DOCUMENTS

| | | |
|---|---|---|
| EP | 0 794 670 A | 9/1997 |
| EP | 0 854 417 A2 | 7/1998 |
| EP | 1 143 679 A2 | 10/2001 |
| EP | 1 450 350 | 8/2004 |
| GB | 0507148.5 | 4/2005 |
| JP | 2000-155529 A | 6/2000 |
| JP | 2003-140672 A | 5/2003 |
| WO | WO 99/48088 A1 | 9/1999 |
| WO | WO 00/51106 A | 8/2000 |
| WO | WO 00/77978 A2 | 12/2000 |
| WO | WO 01/91488 A1 | 11/2001 |
| WO | WO 02/31814 A1 | 4/2002 |
| WO | WO 02/32140 A2 | 4/2002 |
| WO | WO 02/41169 A1 | 5/2002 |
| WO | WO 2004/054217 A1 | 6/2004 |
| WO | WO 2004/062945 A2 | 7/2004 |
| WO | WO 2005/020094 A1 | 3/2005 |
| WO | WO 2006/108795 A1 | 10/2006 |
| WO | WO 2007/031447 A1 | 3/2007 |

OTHER PUBLICATIONS

International Preliminary Report on Patentability and Written Opinion issued Mar. 18, 2008 for Application No. PCT/EP2006/066037.
International Search Report and Written Opinion mailed Mar. 5, 2007 for Application No. PCT/US2006/038411.
International Preliminary Report on Patentability mailed May 15, 2008 for Application No. PCT/U52006/038411.
International Search Report, Jun. 25, 2008; Application No. PCT/EP2008/051358.
Official Action for EP 08717576.6 mailed Mar. 26, 2012.
International Search Report and Written Opinion mailed Jul. 11, 2008 for Application No. PCT/EP2008/052829.
International Preliminary Report on Patentability mailed Sep. 24, 2009 for Application No. PCT/EP2008/052829.
International Search Report, Jun. 18, 2008; Application No. PCT/EP2008/051363.
[No Author Listed], W3C: "Voice Extensible Markup Language (VoiceXML) Version 2.0" Internet Citation, [Online] XP002248286 Retrieved from the Internet: URL: http://www.w3.org/TR/voicexml20 [retrieved on Jul. 18, 2003].
[No Author Listed], W3C: "Voice Extensible Markup Language (VoiceXML) Version 2.1 W3C Candidate Recommendation Jun. 13, 2005" Internet, [Online] Jun. 13, 2005 (2005-16-13), pp. 1-34, XP002484189 Retrieved from the Internet: URL: http://www.w3.org/TR/2005/CR-voicexml21-20050613/ [retrieved on Jun. 6, 2012].
Axelsson et al., "Mobile X+V 1.2," Voice XML Organization, Sep. 5, 2005, www.voicexml.org/specs/multimodal/x+v/mobile/12/>, retrieved Oct. 31, 2006.
Axelsson et al., "XHTML+Voice Profile 1.2" Internet,[Online] Mar. 16, 2004 (Mar. 6, 2004), pp. 1-53, XP002484188 Retrieved from the Internet: URL: http://www.voicexml.org/specs/multimodal/x+v/12/spec.html [retrieved on Jun. 12, 2008].
Carmichael, "Next, Previous, Stop: Implementing an Audio Metaphor of Tape Recorder Buttons for the THISL Information Retrieval Engine Speech Interface," 2002. Available at: www.ida.liu.se/~nlplab/chi-ws-02/papers/carmichael.doc. Last accessed Jan. 13, 2014.
Dalianis et al. "SiteSeeker Voice—A speech controlled search engine," Wapalizer Paper, pp. 1-2, Feb. 25, 2003.
Dalianis et al. "SiteSeeker Voice—A speech controlled search engine," (Feb. 25, 2003), http://www.nada.kth.se/hercules/wapalizer/SiteSeekerVoice.html> retrieved on Oct. 30, 2006.
Franz et al. "Searching the Web by Voice," International Conference on Computational Linguistics, Proceedings of Coling, XX, XX, 2002, pp. 1213-1217.
Google Short Message Service (SMS), [online] [retrieved on Sep. 29, 2005], retrieved from the Internet <URL: http://www.google.com/sms/>.
Guillevic et al., Robust Semantic Confidence Scoring ICSLP 2002: 7th International Conference On Spoken Language Processing. Denver Colorado, Sep. 16-20, 2002 International Conference On Spoken Language Processing (ICSLP), Adelaide: Casual Productions, AI, Sep. 16, 2002, p. 853, XP007011561 ISBN:9788-1-876346-40-9.
Hemphill et al. "Surfing the Web by Voice," Proceedings ACM Multimedia, Nov. 1995, pp. 215-222.
Hunt et al., "Speech Recognition Grammar Specification Version 1.0," W3C Recommendation, Mar. 16, 2004, www.w3.org/TR/speech-grammar/, retrieved Oct. 31, 2006.
Lai et al., "Robustness in Speech Based Interfaces: Sharing the Tricks of the Trade," Proceeding CHI EA '02 CHI '02 Extended Abstracts on Human Factors in Computing Systems. 2002:915.
McCobb, "Multimodal interaction and the mobile Web, Part 1: Multimodal auto-fill," Nov.15, 2005, pp. 1-8, http://www.ibm.com/developerworks/web/library/wi-mobweb/.
McCobb, "Multimodal interaction and the mobile Web, Part 3: User authentication," Jan. 10, 2006, pp. 1-6, http://www.ibm.com/developerworks/wireless/library/wi-mobweb3/.
Nokia 616 Car Kit, [online] [retrieved on Sep. 29, 2005], retrieved from the Internet <URL: http://europe.nokia.com/nokia/0,,65324,00.html>.
Van Tichelen, "Semantic Interpretation for Speech Recognition," W3C Working Draft, Nov. 8, 2004, www.w3.org/TR/2004/WD-semantic interpretation-20041108/, retrieved Oct. 31, 2006.
White, "Multimodal interaction and the mobile Web, Part 2: Simple searches with Find-It", (Feb. 6, 2005), http://www-128.ibm.com/developerworks/web/library/wi-mobweb2/> retrieved on Oct. 31, 2006.
White, "Multimodal interaction and the mobile Web, Part 2: Simple searchers with Find-It," Dec. 6, 2005, pp. 1-5, http://www.ibm.com/developerworks/wireless/library/wi-mobweb2/.
Wyard et al. "Spoken Language Systems—Beyond Prompt and Response," BT Technology Journal, Springer, Dordrect, NL, vol. 14, No. 1, Jan. 1996.

* cited by examiner

RETRIEVAL AND PRESENTATION OF NETWORK SERVICE RESULTS FOR MOBILE DEVICE USING A MULTIMODAL BROWSER

CROSS-REFERENCE TO RELATED APPLICATIONS

This application is a continuation of U.S. patent application Ser. No. 13/283,448, filed on Oct. 27, 2011, which is a divisional of U.S. patent application Ser. No. 11/422,093, filed on Jun. 5, 2006, which claims the benefit of U.S. Provisional Patent Application Ser. No. 60/716,249, which was filed in the U.S. Patent and Trademark Office on Sep. 12, 2005. Each of these applications is incorporated herein by reference in its entirety.

BACKGROUND

1. Field of the Invention

The present invention relates to pervasive computing.

2. Description of the Related Art

A growing number of Web services are being made available to software developers. In general, a Web, or network, service refers to programmable application logic, which is made available to "consumer" applications via standard Internet protocols. Typically, a Web service is self-describing, self-contained, and modular in nature. Consumer applications access the Web service via protocols including Hypertext Transfer Protocol (HTTP) and Extensible Markup Language (XML)-based standards such as Simple Object Access Protocol (SOAP), Web Services Description Language (WSDL), and Universal Description Discovery and Integration (UDDI).

One common function of a Web service is to provide developers with access to different data sets via search engines. Examples of data sets that can be searched via a Web service and/or search engine can include, but are not limited to, weather information, traffic conditions, on-line auctions, and the like. For the most part, users access Web services from consumer applications which execute on conventional computer systems, and thus, have a standard sized display or monitor. The display provides a suitable visual interface through which the user can interact with the application and/or the Web service.

Pervasive computing has garnered significant attention in recent years. Pervasive computing refers to an emerging trend in which computing devices are increasingly ubiquitous, numerous, and mobile. In practical terms, the rise of pervasive computing has meant that users are accessing applications and/or Web services through smaller portable and/or otherwise mobile devices such as portable phones, personal digital assistants, embedded systems, or the like. Users use these portable devices in lieu of more conventional desktop computer systems. These smaller devices have correspondingly smaller displays, making it difficult for users to interact with applications and Web services using purely visual means. Conventional user interaction techniques for mobile devices which involve the use of a stylus and on-screen keyboard or handwriting recognition, however, do not provide users with a fast and accurate means of communication.

It would be beneficial to provide a technique which allows a user to quickly and intuitively access Web services via a mobile computer system which overcomes the limitations described above.

SUMMARY OF THE INVENTION

The present invention provides a solution for obtaining and/or retrieving search results over a network. One embodiment of the present invention can include a method of obtaining information using a mobile device including receiving a request including speech data from the mobile device, and querying a network service using query information extracted from the speech data, whereby search results are received from the network service. The search results can be formatted for presentation on a display of the mobile device. The search results further can be sent, along with a voice grammar generated from the search results, to the mobile device. The mobile device then can render the search results.

Another embodiment of the present invention can include a method of obtaining information using a mobile device. The method can include receiving a request including speech data from the mobile device and dynamically building a query using the speech data. The query can be sent to a network service and, in response, search results can be received from the network service. The method also can include dynamically creating a voice grammar from the search results and creating a multi-modal markup language document including the search results and the voice grammar and sending the multi-modal markup language document to the mobile device.

Yet another embodiment of the present invention can include a machine readable storage, having stored thereon a computer program having a plurality of code sections executable by a machine. The code sections can cause the machine to perform the various steps disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a method, system, and apparatus for obtaining information from a network service.

For example, the present invention can be used to obtain information from search engines and/or other Web services or can function as a Web service in and of itself. In accordance with the inventive arrangements disclosed herein, users can speak into a mobile device which hosts a multimodal browser. The speech data collected from the user's spoken utterance can be converted into a query, which can be forwarded to a network service. Results obtained from the query can be processed for presentation upon a display of the mobile device. For example, results can be formatted using an appropriate markup language. A grammar can be dynamically generated from the search results and included with the markup language document that specifies the search results. The resulting markup language document then can be sent to the mobile device.

Figure 1:
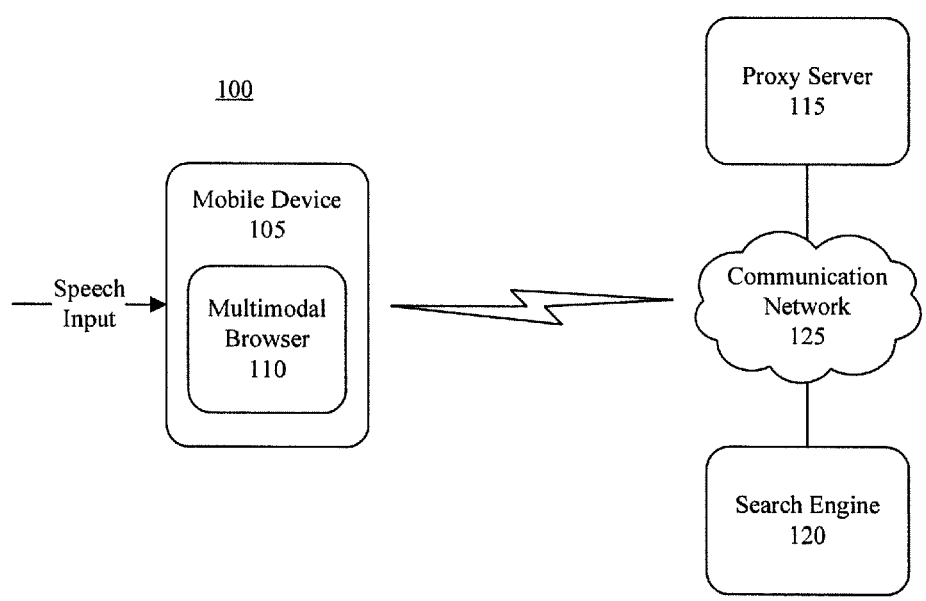
FIG. 1 is a block diagram illustrating a system for retrieving information from a network-based service in accordance with one embodiment of the present invention.

FIG. 1 is a block diagram illustrating a system 100 for retrieving information from a network-based service in accordance with one embodiment of the present invention. As shown, system 100 can include a mobile device 105, a proxy server 115, and a search engine 120. The mobile device 105, the proxy server 115, and the search engine 120 can communicate via a communications network 125. The communications network 125 can include, but is not limited to, a wide area network, a local area network, the Public Switched Telephone Network (PSTN), the Web, the Internet, and one or more intranets. The communications network 125 further can include one or more wireless networks, whether short or long range. For example, in terms of short range wireless networks, the communication network 125 can include a local wireless network built using a Bluetooth or one of the 802.11x wireless communication protocols. In terms of long range wireless networks, the communication network 125 can include a mobile, cellular, and or satellite-based wireless network.

The mobile device 105 can be a handheld device such as a personal digital assistant (PDA), a mobile phone, or the like. In another embodiment, the mobile device can function as a component that is embedded within a larger system such as a larger computer system or a vehicle such as an automobile, plane, boat, or the like. In any case, mobile device 105 can include audio input and output hardware, i.e. a microphone and speaker along with the necessary audio circuitry for digitizing audio and for playing, or rendering, digitized audio via the speaker.

The mobile device 105 can execute an operating system (not shown) and also a multimodal browser 110. The term "multimodal" refers to the ability of the browser 110 to use multiple modes or channels for interactions with a user and/or other computer system within a same communication session. Different modes of interaction can include, but are not limited to, speech, keyboard data entry, touch screen data entry, and stylus data entry. Depending on the situation and the physical configuration and capabilities of mobile device 105, a combination of different input modes can be used for entering data. For example, when executing within a PDA, the multimodal browser 110 can allow a user to select items by tapping on a touch sensitive display as well as by providing spoken input. Similarly, a user can enter data into a given field using either voice input and/or a stylus. Multimodal browser 110 further can visually display and audibly play information to users.

In one embodiment, the multimodal browser 110 can render markup language documents. The particular type of markup language that can be rendered by multimodal browser 110 can be one that is suited for multimodal applications and/or interactions such as XHTML+Voice (X+V) markup language. X+V markup language brings spoken interaction to standard Web content by integrating XHTML and XML-Events technologies with XML vocabularies. X+V has been developed as part of the World Wide Web Consortium (W3C) Speech Interface Framework. The profile includes voice modules that support speech synthesis, speech dialogs, command and control, and speech grammars. Voice handlers can be attached to XHTML elements and respond to specific DOM events, thereby reusing the event model familiar to Web developers. Voice interaction features are integrated with XHTML and cascading style sheets (CSS) and can consequently be used directly within XHTML content. Thus, as used herein, rendering can include, but is not limited to, displaying content specified by a multimodal markup language document, playing audio and/or video content specified by the multimodal markup language document, or playing other media types as may be specified by such a document.

The present invention, however, is not limited to the user of any one particular type of markup language. It should be appreciated that other markup languages capable of supporting multimodal applications and/or interactions can be used. For example, another example of a multimodal technology that can be used can be Speech Application Language Tags (SALT).

Continuing with FIG. 1, the proxy server 115 can be a program executing within a suitable information processing system which can perform various translation functions to be described herein. In one embodiment, the proxy server 115 can be implemented as an Hypertext Transfer Protocol (HTTP) server. Regardless of the particular implementation of the proxy server 115, it can extract information from a request, and particularly from speech data, received from the mobile device 105. The extracted information can be used to formulate and construct a request, such as an HTTP request, which can be forwarded to the search engine 120, or other Web-based or network service.

The search engine 120 is a computer program or application which executes in a suitable information processing system. Search engine 120 can respond to queries or requests. Based upon the received request, the search engine 120 can search and retrieve information which conforms to the request. Typically, the search engine performs a keyword or other type of search by comparing parameters specified by a received query with an index maintained by the search engine 120. The index includes a collection of keywords that have been extracted from available content. The keywords of the index further are associated with the source document(s) or an address of such document(s), whether a text file, a markup language document, a multimedia file, or the like. Accordingly, once a match is found between the query parameters and the index, the corresponding file(s) or address(es), are retrieved. The results, whether a list of documents and addresses, or the actual documents, can be returned to the requestor, in this case the proxy server 115.

The proxy server 115 can format received results into a visual presentation that is more suited for display upon a smaller display screen, which is typical of mobile device 105. While any of a variety of different transform techniques can be used, in one embodiment, an Extensible Stylesheet Language (XSL) transform can be used. The proxy server 115 further can dynamically build a voice grammar from the results received from the search engine 120. The voice grammar allows the user to request additional information for each data item in the search results by voice. This grammar can be added to the search results and sent to the mobile device 105 as a multimodal markup language document.

Figure 2:
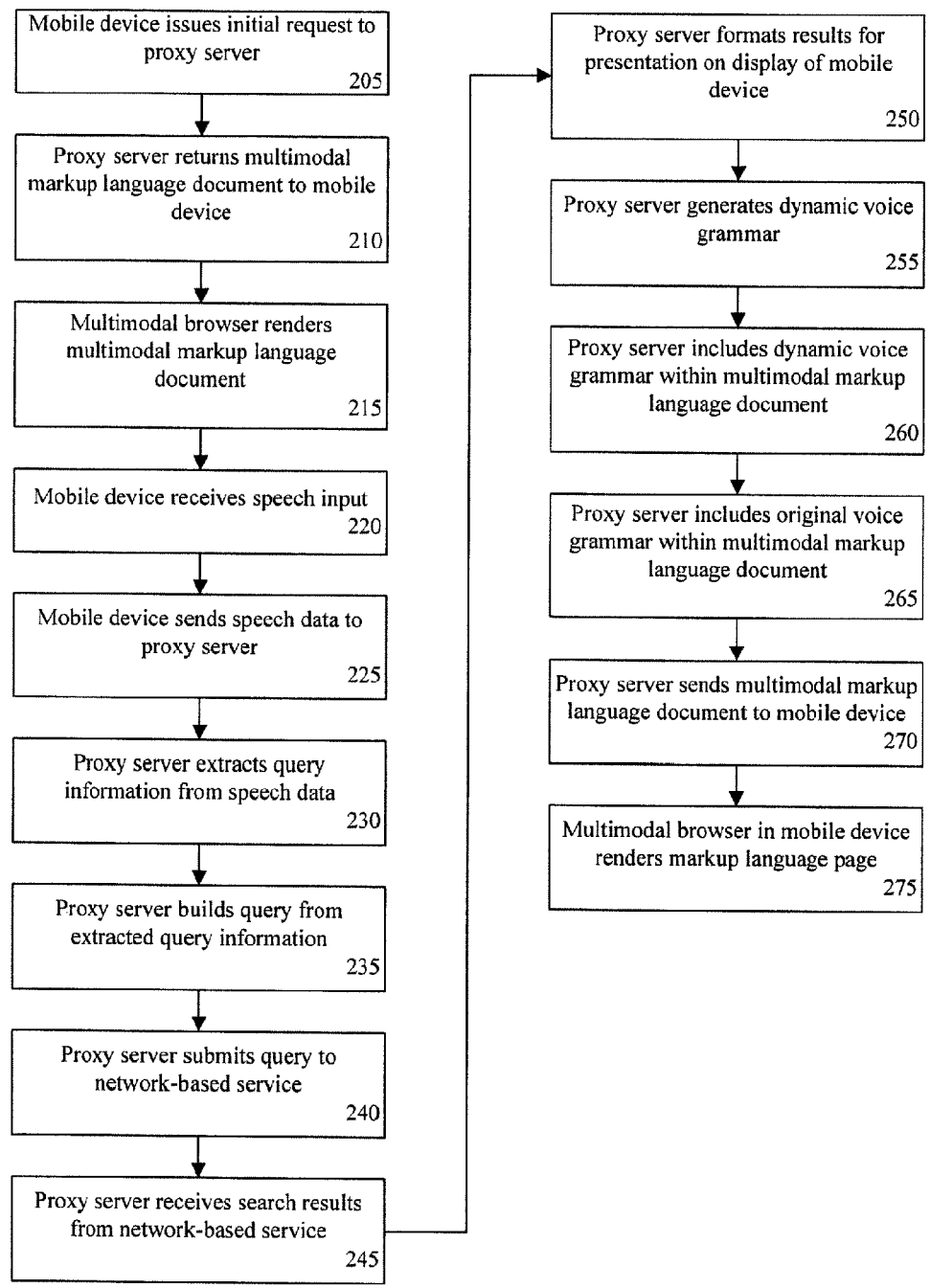
FIG. 2 is a flow chart illustrating a method of retrieving information from a network-based service in accordance with another embodiment of the present invention.

FIG. 2 is a flow chart illustrating a method 200 of retrieving information from a network-based service in accordance with another embodiment of the present invention. In one embodiment, method 200 can be implemented using the system illustrated with reference to FIG. 1. Accordingly, method 200 can begin in step 205, where the mobile device, via the multimodal browser executing therein, issues an initial request to the proxy server. The initial request can request a multimodal markup language document such as an X+V document.

In step 210, the proxy server retrieves the multimodal markup language document identified by the request and forwards the document to the mobile device. This multimodal markup language document can specify or include a voice grammar which allows speech input directed to the mobile device executing the document to be interpreted and/or processed. In step 215, after receiving the multimodal markup language document, the multimodal browser within the mobile device executes or renders the multimodal markup language document. In step 220, the mobile device can receive a speech input from a user. In one embodiment, the speech input can be a spoken search request. For example, a user can say "find pizza restaurants in Boca Raton, Fla.".

In step 225, the mobile device forwards speech data, i.e. the user request, to the proxy server. In one embodiment, the mobile device, and particularly the multimodal browser within the mobile device, can include a speech recognition engine which can convert the user speech to a textual representation. In that case, the speech data sent to the proxy server can be textual representations of received user speech input (s). In another embodiment, speech data can be embodied as audio data, i.e. a digital audio representation of the user speech. In that case, the proxy server can include a speech recognition engine which converts the user speech into a textual representation.

In step 230, the proxy server can extract query information from the received speech data. The speech data can be processed using semantic interpretation. Semantic interpretation allows the proxy server to capture conceptual relationships between smaller concepts and strings. Semantic interpretation can include, but is not limited to, determining the right concept, or sense, for each component of a complex term or phrase. This process can be referred to as semantic disambiguation. The semantic relations which hold among the smaller concepts are identified in order to build more complex concepts.

The extracted data, referred to as query data, can be translated, or used to, build a query in step 235. For example, using semantic interpretation, the proxy server can extract the words "pizza", "restaurant", "Boca Raton", and "Florida" from the user spoken utterance "find pizza restaurant in Boca Raton, Fla.". Semantic interpretation allows the proxy server to effectively identify "pizza" as a modifier of the term "restaurant" indicating a particular type or class of restaurant. Further, location information comprising a city and state is identified which can be used to limit the field of search. The extracted words can function as the parameters within a query that is constructed in step 235. For example, the query that can be constructed from the spoken utterance "find pizza restaurant in Boca Raton, Fla." can be "query=pizza restaurant&city=Boca Raton&state=FL".

In step 240, the proxy server can submit the query that was constructed from the speech data to a network-based service. As noted, in one embodiment, the network-based service can be a search engine, or the like. The network-based service, upon receiving the query from the proxy server, can retrieve the search results and provide the search results to the proxy server. In step 245, the proxy server can receive the search results from the network-based service.

In step 250, the proxy server can format the results received from the network-based service for display upon a display screen of the mobile device. As noted, the display screens of mobile devices, whether handheld, standalone, or embedded devices, typically are small and require special consideration when formatting content for visual presentation. In one embodiment, the proxy server can use a technology such as XSLT transforms to format the received data. In any case, in formatting the search results, the proxy server can generate a multimodal markup language document that specifies the search results. This document can be provided to the mobile device.

In step 255, the proxy server can generate, dynamically, a voice grammar. The voice grammar is generated from the words and/or text included in the search results received from the network-based service. Dynamically creating a voice grammar from the search results allows a user to query the search results and request further information or detail. In step 260, the dynamically created voice grammar can be included within the formatted search results. More particularly, the dynamically created voice grammar can be included, or referenced by, the multimodal markup language document that was created by the proxy server and which specifies the search results. As noted, this allows the user to issue voice requests for further information regarding any of the search result items specified by the multimodal markup language document.

In step 265, the voice grammar that was included in the multimodal markup language document sent to the mobile device in step 210, responsive to the initial request, also can be included within, or referenced by, the multimodal markup language document that specifies the search results. Including the original voice grammar provides the user with greater flexibility in terms of querying the search results using voice commands.

In step 270, the proxy server sends the multimodal markup language document to the mobile device. In step 275, the multimodal browser executing within the mobile device renders the received multimodal markup language document. Thus, mobile device can visually display and/or play content specified by the multimodal markup language document. As noted, since a grammar which was built from the search results is included with the multimodal markup language document, the user can request, via voice, additional information pertaining to any of the search result items.

Figure 3:
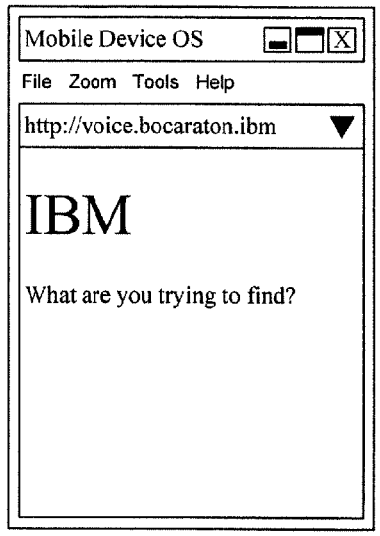
FIG. 3 is a pictorial view of a graphical user interface (GUI) illustrating another aspect of the present invention.

FIG. 3 is a pictorial view of a graphical user interface (GUI) 300 illustrating another aspect of the present invention. GUI 300 illustrates a view of a mobile device display executing a suitable multimodal browser as discussed herein. GUI 300 illustrates the rendering of an initial multimodal markup language document which can be obtained and downloaded from the proxy server. This multimodal markup language document is responsible for receiving the initial user request that will be processed and converted into a request to be submitted to the network-based service.

Figure 4:
FIG. 4 is a pictorial view of a GUI illustrating another aspect of the present invention.

FIG. 4 is a pictorial view of a GUI 400 illustrating another aspect of the present invention. GUI 400 illustrates the rendering of the multimodal markup language document that is returned from the proxy server and which specifies the search results obtained from the network-based service. For example, if the user speech provided as input to the multimodal markup language document of FIG. 3 was "find golf courses in Omaha, Nebr.", that speech data can be provided to the proxy server. The proxy server can process the speech data and extract query parameters (or query information) such as "golf courses", "Omaha", and "NE". This information can be used to build a query such as "query=golf courses&city=Omaha&state=NE". This query can be provided to the network-based service.

As noted, results received from the network-based service can be formatted using a suitable multimodal markup language for display upon a display screen of the mobile device. Thus, GUI 400 illustrates the results obtained from such a query after formatting by the proxy server and rendering by the multimodal browser of the mobile device. While any word specified by the multimodal markup language document rendered in GUI 400 can be included in the dynamically generated voice grammar disclosed herein, in another embodiment, allowable words, or those words included within the grammar can be bolded as shown. It should be appreciated that any suitable means of visually indicating speakable, or allowable, words, i.e. color or the like, also can be used if so desired.

Figure 5:
FIG. 5 is a pictorial view of a GUI illustrating yet another aspect of the present invention.

FIG. 5 is a pictorial view of a GUI 500 illustrating yet another aspect of the present invention. GUI 500 illustrates the case where the user has issued a voice command or query asking for further information regarding golf course 1 from FIG. 4. By speaking one or more words indicating golf course 1, as permitted by the dynamically generated voice grammar, that speech data is provided to the proxy server, processed as discussed herein, and submitted to the network-based service to obtain more detailed information. Results from this most recent query can be returned to the proxy server and formatted. The resulting multimodal markup language document, after rendering, is illustrated by GUI 500. As was the case with reference to FIG. 4, any of the words shown in GUT 500 also can be included within a further dynamically generated grammar thereby allowing the user to access additional detailed information such as a Web link for further details, a Web link for a map of the area surrounding the golf course, or a Web link to the golf courses of the City of Omaha, Nebr.

It should be appreciated that the inventive arrangements disclosed herein can be applied to search and retrieval of any of a variety of different types of information through speech. As such, the various examples discussed herein have been provided for purposes of illustration only and are not intended to limit the scope of the present invention. Further, the various embodiments described herein need not be limited to use with mobile devices. That is, the embodiments described herein can be used with conventional computer systems, whether linked with a communication network via a wired or wireless communication link. Similarly, though the mobile device has been depicted herein as being linked with the communication network through a wireless communication link in FIG. 1, the present invention also contemplates that such a device can be communicatively linked with the proxy server via a wired connection or a combination of both wired and wireless connections.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method comprising acts of:
   sending from a device, via at least one communication medium, a request to obtain information;
   receiving at the device, via the at least one communication medium, a response to the request to obtain information, the response comprising one or more search results and a voice grammar dynamically generated based on the one or more search results;
   presenting via the device at least some of the one or more search results to a user of the device; and
   using the voice grammar dynamically generated based on the one or more search results to process user speech spoken by the user subsequent to the at least some of the one or more search results being presented to the user.

2. The method of claim 1, wherein the request to obtain information is a first request, and the act of using the voice grammar dynamically generated based on the one or more search results to process the user speech comprises determining that the user speech comprises an indication that the user desires to select at least one search result of the one or more search results, and wherein the method further comprises an act of:
   in response to determining that the user speech comprises an indication that the user desires to select the at least one search result, sending a second request via the at least one communication medium, the second request requesting information relating to the at least one search result.

3. The method of claim 2, wherein the response to the first request is a first response and the voice grammar dynamically generated based on the one or more search results is a first voice grammar, and wherein the method further comprises acts of:
   receiving at the device, via the at least one communication medium, a second response in response to the second request, the second response comprising one or more pieces of information relating to the at least one search result and a second voice grammar dynamically generated based on the one or more pieces of information;

presenting via the device at least some of the one or more pieces of information to the user; and using the second voice grammar dynamically generated based on the one or more pieces of information to process user speech spoken by the user subsequent to the at least some of the one or more pieces of information being presented to the user.

4. The method of claim 1, wherein the act of presenting the at least some of the one or more search results to the user comprises:

providing an indication to the user that the user is allowed to select at least one search result of the one or more search results by speaking one or more words associated with the at least one search result.

5. The method of claim 4, wherein providing an indication to the user comprises providing a visual indication that distinguishes the one or more words associated with the at least one search result from other words presented to the user.

6. The method of claim 1, wherein the request to obtain information is a subsequent request and the voice grammar dynamically generated based on the one or more search results is a subsequent voice grammar, and wherein the method further comprises acts of:

sending from the device an initial request via the at least one communication medium;

receiving at the device, via the at least one communication medium, an initial response to the initial request, the initial response comprising an initial voice grammar; and using the initial voice grammar to process user speech spoken by the user.

7. The method of claim 6, further comprising an act of:

generating the subsequent request as a result of using the initial voice grammar to process user speech.

8. A system comprising at least one processor configured to:

send, via at least one communication medium, a request to obtain information;

receive, via the at least one communication medium, a response to the request to obtain information, the response comprising one or more search results and a voice grammar dynamically generated based on the one or more search results;

present via the device at least some of the one or more search results to a user of the device; and use the voice grammar dynamically generated based on the one or more search results to process user speech spoken by the user subsequent to the at least some of the one or more search results being presented to the user.

9. The system of claim 8, wherein the request to obtain information is a first request, and using the voice grammar dynamically generated based on the one or more search results to process the user speech comprises determining that the user speech comprises an indication that the user desires to select at least one search result of the one or more search results, and wherein the at least one processor is further configured to:

in response to determining that the user speech comprises an indication that the user desires to select the at least one search result, send a second request via the at least one communication medium, the second request requesting information relating to the at least one search result.

10. The system of claim 9, wherein the response to the first request is a first response and the voice grammar dynamically generated based on the one or more search results is a first voice grammar, and wherein the at least one processor is further configured to:

receive, via the at least one communication medium, a second response in response to the second request, the second response comprising one or more pieces of information relating to the at least one search result and a second voice grammar dynamically generated based on the one or more pieces of information;

present at least some of the one or more pieces of information to the user; and use the second voice grammar dynamically generated based on the one or more pieces of information to process user speech spoken by the user subsequent to the at least some of the one or more pieces of information being presented to the user.

11. The system of claim 8, wherein the at least one processor is further configured to present the at least some of the one or more search results to the user at least in part by:

providing an indication to the user that the user is allowed to select at least one search result of the one or more search results by speaking one or more words associated with the at least one search result.

12. The system of claim 11, wherein providing an indication to the user comprises providing a visual indication that distinguishes the one or more words associated with the at least one search result from other words presented to the user.

13. The system of claim 8, wherein the request to obtain information is a subsequent request and the voice grammar dynamically generated based on the one or more search results is a subsequent voice grammar, and wherein the at least one processor is further configured to:

send an initial request via the at least one communication medium;

receive, via the at least one communication medium, an initial response to the initial request, the initial response comprising an initial voice grammar; and use the initial voice grammar to process user speech spoken by the user.

14. The system of claim 13, wherein the at least one processor is further configured to:

generate the subsequent request as a result of using the initial voice grammar to process user speech.

15. At least one computer-readable storage device having encoded thereon instructions that, when executed by at least one processor of a device, perform a method comprising acts of:

sending from the device, via at least one communication medium, a request to obtain information;

receiving at the device, via the at least one communication medium, a response to the request to obtain information, the response comprising one or more search results and a voice grammar dynamically generated based on the one or more search results;

presenting via the device at least some of the one or more search results to a user of the device; and using the voice grammar dynamically generated based on the one or more search results to process user speech spoken by the user subsequent to the at least some of the one or more search results being presented to the user.

16. The at least one computer-readable storage device of claim 15, wherein the request to obtain information is a first request, and the act of using the voice grammar dynamically generated based on the one or more search results to process the user speech comprises determining that the user speech comprises an indication that the user desires to select at least one search result of the one or more search results, and wherein the method further comprises an act of:

in response to determining that the user speech comprises an indication that the user desires to select the at least one search result, sending a second request via the at least one communication medium, the second request requesting information relating to the at least one search result.

17. The at least one computer-readable storage device of claim 16, wherein the response to the first request is a first response and the voice grammar dynamically generated based on the one or more search results is a first voice grammar, and wherein the method further comprises acts of:

receiving at the device, via the at least one communication medium, a second response in response to the second request, the second response comprising one or more pieces of information relating to the at least one search result and a second voice grammar dynamically generated based on the one or more pieces of information;

presenting via the device at least some of the one or more pieces of information to the user; and using the second voice grammar dynamically generated based on the one or more pieces of information to process user speech spoken by the user subsequent to the at least some of the one or more pieces of information being presented to the user.

18. The at least one computer-readable storage device of claim 15, wherein the act of presenting the at least some of the one or more search results to the user comprises:

providing an indication to the user that the user is allowed to select at least one search result of the one or more search results by speaking one or more words associated with the at least one search result.

19. The at least one computer-readable storage device of claim 18, wherein providing an indication to the user comprises providing a visual indication that distinguishes the one or more words associated with the at least one search result from other words presented to the user.

20. The at least one computer-readable storage device of claim 15, wherein the request to obtain information is a subsequent request and the voice grammar dynamically generated based on the one or more search results is a subsequent voice grammar, and wherein the method further comprises acts of:

sending from the device an initial request via the at least one communication medium;

receiving at the device, via the at least one communication medium, an initial response to the initial request, the initial response comprising an initial voice grammar; and using the initial voice grammar to process user speech spoken by the user.

* * * * *